United States Patent Office 2,792,133
Patented May 14, 1957

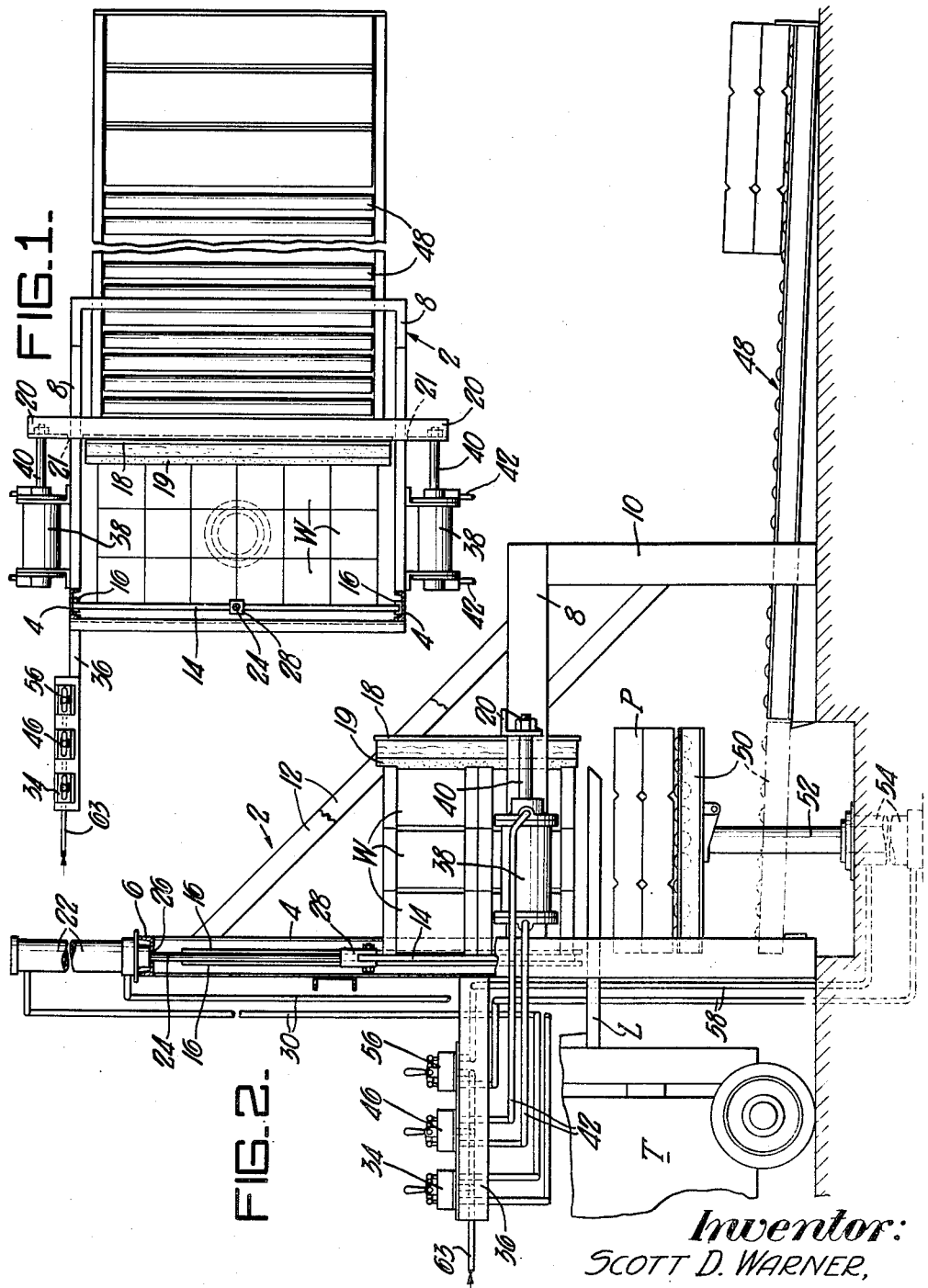

2,792,133
APPARATUS FOR UNLOADING PALLETS

Scott D. Warner, Pittsburg, Calif., assignor to United States Steel Corporation, a corporation of New Jersey Application October 29, 1953, Serial No. 389,089

3 Claims. (Cl. 214—38)

The present invention relates generally to material handling equipment and more particularly to apparatus for mechanically unloading a pallet.

The use of pallets for supporting articles so that they can be conveniently transported is common in present day industrial plants. The pallet generally consists of a platform of wood or metal supported by runners or skids. The pallet is so designed that the lift fork of a fork-type industrial truck may be easily inserted under the loaded pallet to lift and carry it to a desired destination.

When articles such as boxes of nails are to be shipped out of a plant, they are usually transported to the shipping platform on pallets and there unloaded from the pallet and loaded into a freight car or truck manually. The unloading of the boxes from the pallet before loading them in the car or truck is necessary since it is not desired to include the pallets in the shipment. It would be uneconomical to take up valuable shipping space with the pallets. Ordinarily each pallet may be used repeatedly so that a further reason for not including them in the shipment would be their loss to the shipping manufacturer.

The manual handling of the articles not only increases the time necessary to prepare a load for shipment to a costly excess but, further, where the weight of each article approaches or exceeds one hundred pounds, the workmen become unduly fatigued after handling a relatively small number of the articles.

It is accordingly an object of my invention to provide apparatus for removing a load of articles from a pallet whereby the load of articles is held in elevated position by laterally exerted compressive stresses while the pallet is removed from under the load and a self-unloading support is substituted in its place.

It is a further object of my invention to provide apparatus for depalletizing a load of articles without the need for manually handling the articles.

These and other objects will become more apparent after referring to the following specification and attached drawing, in which:

Figure 1 is a plan view; and
Figure 2 is a side elevational view.

Referring more particularly to the drawing, reference numeral 2 designates generally the frame of an exemplary form of my invention which includes a pair of spaced upright channel columns 4 disposed in parallel relation and spanned at the tops thereof by a cross channel plate 6. A pair of parallel spaced elongated channels 8 extend at right angles from the columns 4. The free ends of the channels 8 are each attached to and supported by a vertically disposed supporting member 10. Suitable diagonal braces 12 are provided for strengthening the frame structure.

A gate 14 is mounted for vertical movement between the columns 4 with its ends retained in opposed vertical guideways 16. A sliding back plate 18 having a resilient pad 19 on its work-engaging face is slidably mounted on and extends transversely between the channels 8 for horizontal movement toward and away from the columns 4. The back plate 18 projects above and below the level of the channels 8 and is provided with a projection 20 extending laterally from the mid-portion of each side thereof. The projections 20 are each provided with a vertical slot 21 which engages the channels 8.

The gate 14 is raised and lowered by means of a two-way pressure fluid cylinder 22, which cylinder 22 is mounted in upright position on the cross channel 6 with its piston rod 24 projecting downwardly through a hole 26 in the plate 6 to a connection with the top edge of the gate 14, as at 28. Pneumatic lines 30 are connected with the cylinder 22 and extend therefrom to a four-way valve 34. The valve 34 is mounted on a projection 36 which extends at right angles to one of the columns 4 in the direction opposite to the channels 8.

The slidable back plate 18 is connected with and moved by means of a pair of two-way pressure fluid cylinders 38, one of which is mounted on the outside surface of each of the elongated channel plates 8. The piston rod 40 of each of the cylinders 38 projects in the direction away from the columns 4 and is bolted or otherwise rigidly fastened to one of the projections 20. Pneumatic lines 42 are connected at their one end with the cylinders 38 and at their other end to a four-way valve 46 which is mounted on the projection 36 adjacent the valve 34.

Although I have found it preferable to provide two cylinders for moving the back plate so as to insure positive uniform stress across the entire length of the back plate, if desired, a single cylinder mounted on the frame behind the center portion of the back plate may be used.

A conventional inclined roller conveyor 48 having an elevator section 50 at its elevated end is disposed under the frame 2 with the elevator section 50 adjacent the columns 4. The elevator section 50 is raised and lowered by the piston rod 52 of a hydraulic cylinder 54 which is disposed below floor level under the frame 2. The cylinder 54 is actuated by means of a four-way valve 56 which is mounted on the projection 36 adjacent the valve 46. Pneumatic lines 58 connect the cylinder 54 with the valve 56.

A pressure fluid supply line 63 is connected with the valves 34, 46 and 56.

In use, to depalletize a load of boxed nails W from a pallet P, a conventional industrial fork lift truck T transports the loaded pallet to the frame 2 and inserts the pallet between the columns 4 so that one side of the load of boxes abuts the back plate 18 which is in position at the end of its path of travel remote from the columns 4. While the loaded pallet is thus being positioned, the gate 14 is in raised position above the level of the back plate 18. While the pallet is supported in raised position by the fork lift truck with the load of boxes abutting the back plate 18, the valve 34 is actuated to lower the gate 14 until it is adjacent the side of the load opposite the back plate 18. Then the valve 46 is operated to actuate the cylinders 38 to retract the piston rods 40 and move the back plate 18 toward the gate 14 and exert compressive stress laterally on the load. The load is then held in suspension between the gate 14 and the back plate 18 and the fork lift of the truck is lowered to deposit the empty pallet on the elevator section 50. After the pallet has been so deposited, the fork lift truck is withdrawn and a truck T equipped with a conventional self-unloading load plate L is moved into position to dispose the load plate L beneath the suspended load of boxes. After the load plate L has been positioned, the valve 46 is operated to project the piston rods 40 to move the back plate away from the load and relieve the stress thereagainst and permit the load to be supported by the load plate L. Valve 34 is then operated to raise the gate 14. The truck T then withdraws the load of boxes and transports it to its destination where it is removed from the load plate L by the self-unloading mechanism of the truck. The elevator section 50 of the conveyor is progressively lowered to allow a stack of empty pallets to accumulate thereon. After a full stack of pallets have accumulated on the elevator section, it is lowered level with the conveyor 48, whereupon the stack of boxes is rolled away from the frame 2.

If desired, the gate 14 may be replaced by an abutment fixed in position spanning the columns 4 spaced from the back plate. When this is done, the load may be inserted between the columns below the fixed abutment and then raised into position.

While one embodiment of my invention has been shown and described, it will be apparent that other adaptations and modifications may be made without departing from the scope of the following claims.

I claim:

1. Apparatus for transferring a load of articles from a pallet to the load plate of a truck which comprises a frame, said frame including a pair of spaced upright columns disposed in parallel relation, a cross member attached to and spanning the upper ends of said columns, an elongated support guide attached to and extending from each of said columns intermediate the length thereof in a plane normal thereto, said support guides being disposed in parallel relation, a gate mounted for vertical movement between said columns, a fixed vertical guideway on each of said columns slidably engaged by said gate, first power means mounted on said frame and connected with said gate for moving the same, a back plate slidably mounted on and extending transversely between said elongated support guides, said back plate being mounted for horizontal movement along said guide supports toward and away from said columns, second power means mounted on said frame and connected with said back for moving the same, and means mounted on said frame for actuating said first and second power means.

2. Apparatus for transferring a load of articles as defined by claim 1 characterized by said first power means including a two-way fluid pressure cylinder mounted in upright position on said cross member, said cylinder having a piston slidable therein, and a piston rod having one end attached to said piston and its other end projecting outwardly from the bottom of said cylinder, the projecting end of said piston rod being connected with said gate.

3. Apparatus for transferring a load of articles as defined by claim 1 characterized by said second power means including a two-way fluid pressure cylinder mounted in horizontal position on each of said elongated guide supports, each of said cylinders having a piston therein and a piston rod projecting therefrom, the projecting end of each of said piston rods being connected with said back plate.

References Cited in the file of this patent

UNITED STATES PATENTS

| Number | Name | Date |
|---|---|---|
| 1,131,489 | Dowd et al. | Mar. 9, 1915 |
| 2,061,495 | Woodruff | Nov. 17, 1936 |
| 2,394,692 | Isler | Feb. 12, 1946 |
| 2,451,226 | Kemp | Oct. 12, 1948 |
| 2,560,206 | Beatty | July 10, 1951 |
| 2,601,932 | Turner | July 1, 1952 |
| 2,695,110 | Feidert | Nov. 23, 1954 |